United States Patent [19]

Herriau

[11] 4,392,439

[45] Jul. 12, 1983

[54] PNEUMATIC TRANSPORT DEVICE PARTICULARLY FOR SINGLE-SEED SEED DRILL

[75] Inventor: Paul Herriau, Cambrai, France

[73] Assignee: Societe SOGEFINA, Societe de Gestion Financiere Armoricaine, Paris, France

[21] Appl. No.: 249,365

[22] Filed: Mar. 31, 1981

[30] Foreign Application Priority Data

Mar. 31, 1980 [FR] France .................... 80 07190

[51] Int. Cl.³ .................... A01C 7/04; A01C 7/20
[52] U.S. Cl. .................... 111/34; 221/278; 406/83; 406/84; 406/108; 406/144
[58] Field of Search .................... 111/34; 221/278; 406/83, 84, 144, 153, 108, 109

[56] References Cited

U.S. PATENT DOCUMENTS

| 3,322,080 | 5/1967 | Gatzke et al. | |
| 3,964,639 | 6/1976 | Norris et al. | 221/278 |

FOREIGN PATENT DOCUMENTS

| 410691 | 3/1925 | Fed. Rep. of Germany . | |
| 1229027 | 9/1960 | France | 111/34 |
| 1284678 | 1/1962 | France . | |
| 2291927 | 6/1976 | France . | |
| 650906 | 3/1979 | U.S.S.R. | 406/144 |

Primary Examiner—Steven A. Bratlie
Attorney, Agent, or Firm—Young & Thompson

[57] ABSTRACT

The present invention relates to a pneumatic transport device particularly for seed drills. The device comprises an inlet tube 10 into which the seeds are introduced one by one, an annular passage 13 of convergent form for air under pressure at the periphery of the end of the inlet tube 10 and a cylindrical passage 14 whose end is connected to the pneumatic transport tube 17 and, according to the invention and downstream and at a small distance from the neck of the annular passage 13 of convergent form, at least one opening 18 communicating between the cylindrical passage 14 and the atmosphere. The invention is applicable particularly to a seed drill comprising a central distributor which feeds a large number of ploughshares.

2 Claims, 1 Drawing Figure

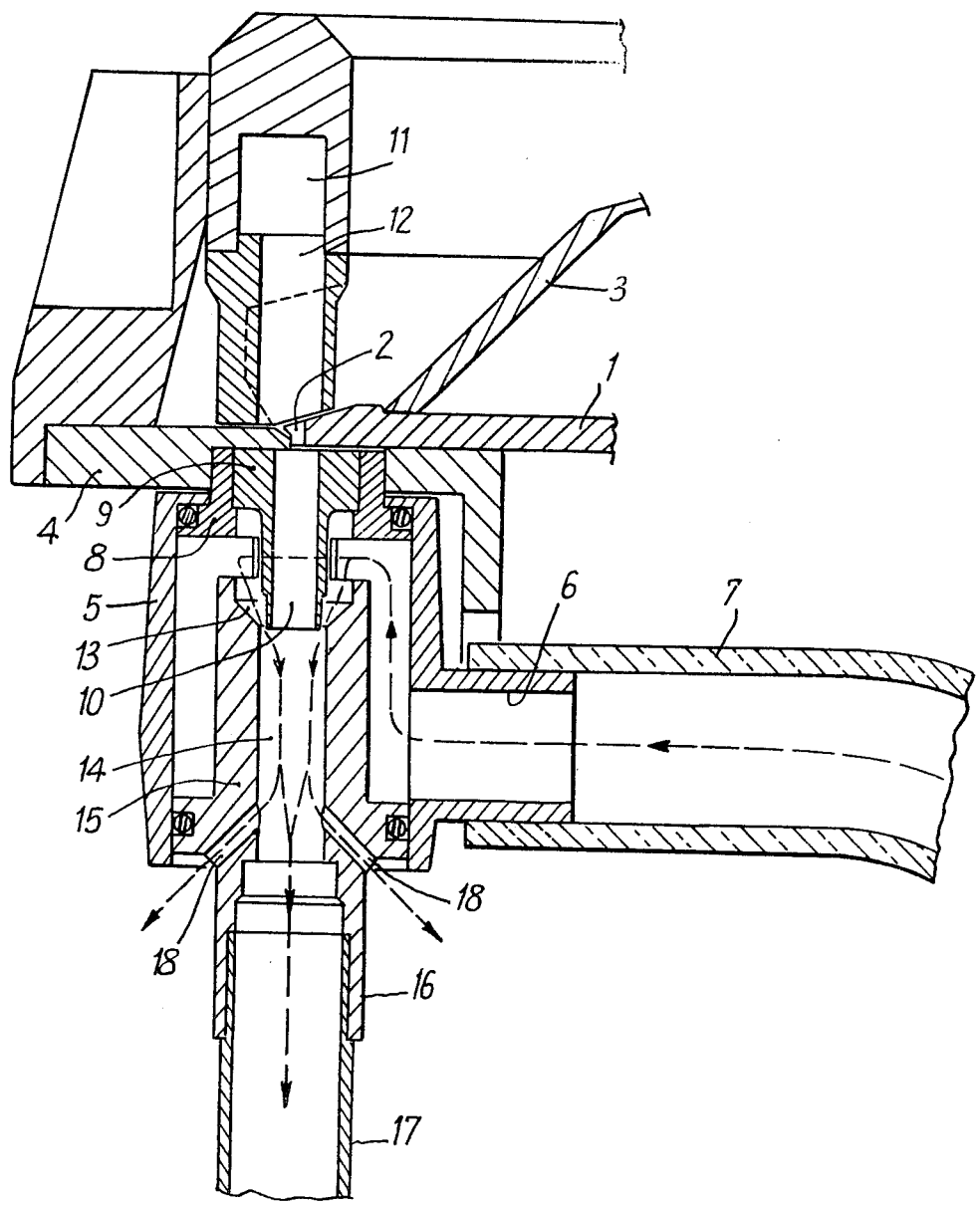

PNEUMATIC TRANSPORT DEVICE PARTICULARLY FOR SINGLE-SEED SEED DRILL

The present invention relates to pneumatic transport devices and particularly, in seed drills, the pneumatic transport of the seeds distributed one by one by a distributor, from this distributor to the point of deposit on the ground or in the furrow.

Such a device which illustrates the prior art is described for example in French Pat. No. 1,284,678 and it comprises an inlet tube into which the seeds are introduced one by one, a so-called spacing device constituted by a cone through whose base extends the inlet tube and an outlet tube extending from the summit of the cone to end in the furrow. Air under pressure is introduced into the cone and passes between the wall of the latter and the end of the inlet tube to create a suction in the inlet tube and a discharge pressure in the outlet tube. The end of the outlet tube adjacent the soil comprises perforations to permit the air to escape so as not to blow away the seed deposited in the furrow.

In the device described in the above-identified patent in which a distributor feeds a single row and is disposed quite close to the ploughshare, the outlet tube is very short and has a constant cross section, but it has been determined that, in seed drills comprising a central distributor from which extend outlet tubes whose length may be several meters to feed the outermost ploughshares of a twelve-row seed drill, there results a pneumatic phenomenon which leads to poor operation and disturbances, the air current being able to reverse itself in the inlet tube which is very short relative to the outlet tube.

The nature of this phenomenon has not been clearly determined by the inventor but it is supposed that the so-called spacing device, which is in fact an injector functioning as a venturi, creates in the first portion of the outlet tube which forms a throat, a suction zone in which the air has very high speed which is followed by a tube of great length with variations of cross section in which this speed is converted to pressure. Now in this pneumatic transport, in the tubes of relatively reduced cross section, with separate seeds, it is necessary not to use a pressure to overcome the resistance of a dense column as in the usual pneumatic transports but to create a high and constant speed.

This is achieved according to the invention by the provision, in the outlet conduit and at a short distance downstream of the outlet of the intake column, in the injection cone, compressed air ensuring the propulsion, of at least one air outlet orifice.

It has been determined in a totally unexpected way that these orifices which evacuate a portion of the volume of injected air under pressure and of the volume of air taken in by the inlet tube avoid the above phenomenon.

According to a preferred embodiment the transport device comprises opposite each distribution station of the distributor, a sealed cylindrical chamber in communication with a feed conduit for air under pressure, a short central inlet tube emptying axially in the upper portion of this chamber, a transport tube connection opening axially in the lower part of this chamber, this tube ending in a substantially frustoconical enlargement surrounding the end of the intake tube and at least one hole passing through this transport tube connection to open, on the one hand, in the central tubular passage of the latter and, on the other hand, at the exterior of said sealed chamber.

Preferably, the bores constituting the holes diverge downstream and their total cross section corresponds to about $\frac{1}{2}$ to $\frac{1}{3}$ of the cross section of the tubular passage of the connector.

The invention will be described in greater detail hereafter with reference to the attached single FIGURE of drawing which shows in radial axial cross section a distribution station of a distributor of a "single-seed" seed drill.

The distributor shown by way of example is one of the type comprising a rotatable plate 1 having in its periphery recesses 2 in each of which will be received one seed, the seeds being poured on the central conical portion 3 of the rotatable plate. This peripheral portion of rotatable plate 1 moves above a fixed plate 4 at the periphery of which are spaced distribution stations of which one is shown in detail in the drawing. These distribution stations are of a number equal to that of the rows to be sowed.

Each distribution station comprises a body 5 in which is provided a cylindrical bore and a connection 6 for a flexible tube 7 to feed air under pressure. The cylindrical recess of the body is closed in sealed manner at its upper portion by a ferrule 8 fixed to the fixed plate 4 for example by screw threads. In this ferrule is disposed the element 9 forming the inlet tube 10 into which falls the seed stored in a recess 2 when this recess arrives opposite tube 10, this movement being facilitated by the suction effect created in tube 10 by the venturi effect which will be described hereinafter and by the current of air sucked into the chamber 11 by the coaxial passage 12 or from the exterior by the clearance existing between the rotatable plate and the fixed portions particularly the fixed plate 4, which sucks the seeds into the recesses 2.

The lower end of the tubular element 9, whose external section is reduced, is engaged in a frusto-conical end enlargement 13 of a axial tubular passage 14 of a member 15 comprising the connection of the transport tube. This member 15 is engaged in sealed fashion in the cylindrical chamber of the body 5 and terminates at the exterior of this chamber in connecting element 16 for the flexible transport tube 17 which leads to the seed setting means in each furrow.

According to the invention six oblique holes 18 regularly spaced about the periphery communicate between the downstream end of the tubular passage 14 of member 15 and the atmosphere. In the illustrated embodiment the feed is effectuated under a pressure of 0.15 to 0.20 kg/mm$^2$, the tubular passage 14 has a cross section of 104 mm$^2$ and a length of about 40 mm, the tubular passage 10 a cross section of 50 mm$^2$, the annular passage at the periphery of the end of the member 9 has a cross section of 24 mm$^2$ and the tube 17 has an internal cross section of 133 mm$^2$ and a length ranging from 1.40 to 3 meters. According to the invention, there are provided six oblique holes 18 of 3 mm diameter having a total cross section of 42.5 mm$^2$. In this embodiment, the pneumatic transport of the seeds is effected uniformly, without jerkiness and with a very great regularity of spacing between the seeds. When the openings 18 have become stopped up, there have been noticed disturbances in the transport and in the spacing of the seeds.

What is claimed is as follows:

1. In a pneumatic transport apparatus particularly for single-seed drills, comprising an inlet tube (10) into which the seeds are introduced one by one, an annular passage (13) of convergent form for air under pressure about the end of the inlet tube (10) and a tubular passage (14) whose one end communicates with said annular passage and whose other end is connected to a pneumatic transport tube (17); the improvement comprising downstream and at a small distance from the neck of the annular passage (13) of convergent form, a plurality of openings (18) communicating between the tubular passage (14) and the atmosphere and diverging downstream at an acute angle from the axis of said tubular passage (14), the total cross-sectional area of said openings (18) corresponding to about ½ to ⅓ of the cross-sectional area of said tubular passage (14), whereby the pressure is decreased downstream from said openings (18).

2. A pneumatic transport device according to claim 1, comprising a sealed cylindrical chamber (5) in communication with a passageway (7) for feeding air under pressure, said inlet tube (10) opening axially into the upper portion of said chamber (5), a connection (15) for the transport tube, said tubular passage (14) extending through said connection (15) and enlarging upwardly to surround the lower end of the inlet tube (10) and to define said annular passage (13) between said connection (15) and said inlet tube (10), said openings (18) passing through said connection (15) and opening, on the one hand into said tubular passage (14) and, on the other hand, outside said sealed chamber (5).

* * * * *